(No Model.)
A. H. FREDERICK
BLOTTER.
No. 295,625. Patented Mar. 25, 1884.
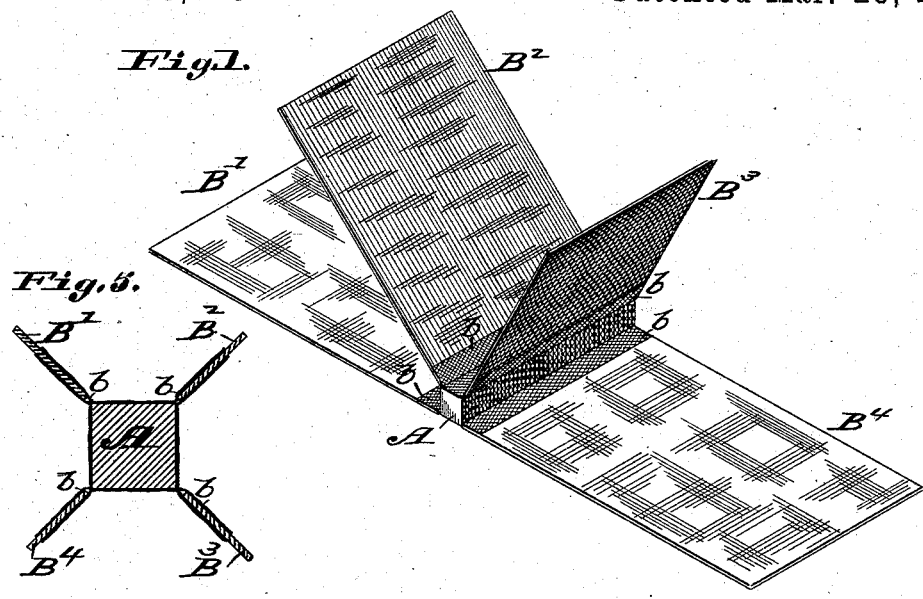
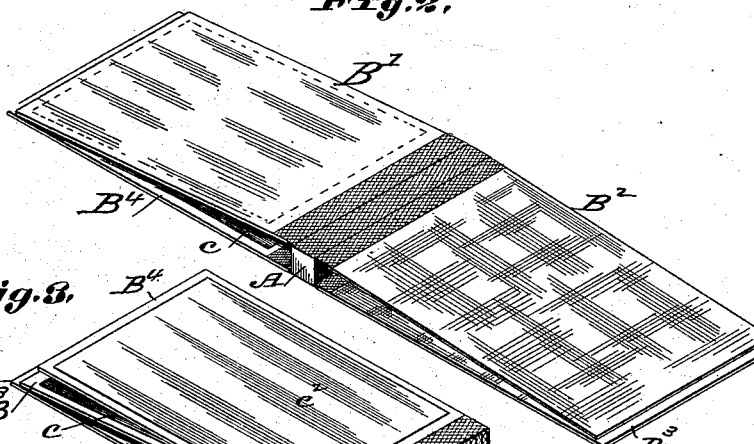
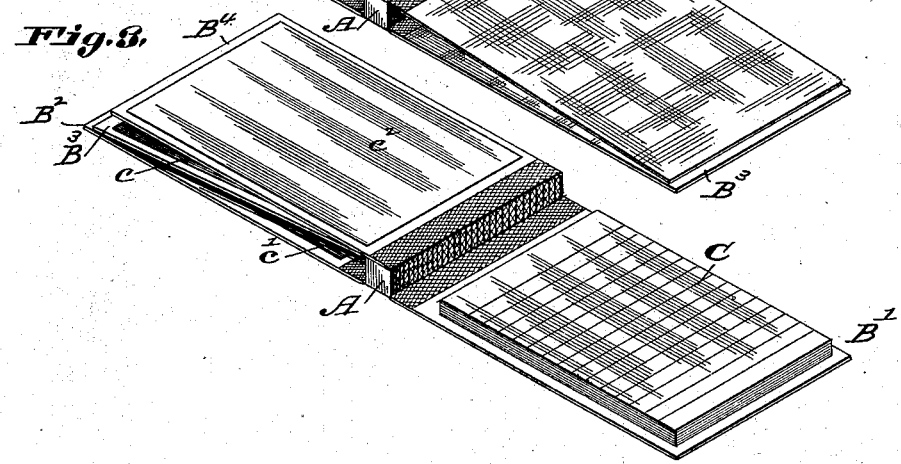
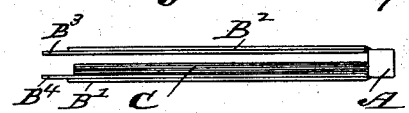
Attest:
Charles Pickles
C. E. Hunt
Inventor.
August H. Frederick
by C. D. Moody
atty

UNITED STATES PATENT OFFICE.

AUGUST H. FREDERICK, OF ST. LOUIS, MISSOURI.

BLOTTER.

SPECIFICATION forming part of Letters Patent No. 295,625, dated March 25, 1884.

Application filed January 24, 1884. (No model.)

*To all whom it may concern:*

Be it known that I, AUGUST H. FREDERICK, of St. Louis, Missouri, have made a new and useful Improvement in Blotters, of which the following is a full, clear, and exact description, reference being had to the annexed drawings, making part of this specification, in which—

Figure 1 is a view in perspective of the improved blotter opened; Fig. 2, a view in perspective of the blotter opened with its leaves lying flat; Fig. 3, another view in perspective of the blotter opened with its leaves in a different position; Fig. 4, an end view of the blotter closed; and Fig. 5, a cross-section upon an enlarged scale, showing the head of the blotter and the inner ends of the leaves.

The same letters of reference denote the same parts.

The present invention consists, substantially, in a series of blotting-leaves attached to a head, substantially as hereinafter described.

A represents the head. It in practice consists of a squared piece of wood in thickness equal, or thereabout, to the thickness of an ordinary block of note-paper. The leaves $B' B^2 B^3 B^4$, by means of the flaps $b\ b\ b\ b$, are hinged to the head, and preferably to the corners of the head, as shown more distinctly in Figs. 1, 5. The aim and effect of this combination is to enable a series of leaves to be opened as desired—that is, either of the leaves may be the undermost of the series or the uppermost, or it may occupy any intermediate position. The block C of paper may be inserted between either two of the leaves and the leaves be opened, as shown in Fig. 3, or the leaves may be closed upon the block, as shown in Fig. 4; or, when more than one sheet of note-paper is being used at the writing, the first sheet may be detached from the block and inserted between two of the leaves, as shown at $c$, Fig. 3, while the block remains in the position shown in that figure for further use; or two of the sheets may be detached from the block and inserted between the various leaves, as shown at $c'\ c$, respectively, Fig. 3. Further, as one side of a leaf is exhausted the other side may be brought into use, and as any pair of leaves is used up another pair of leaves may be brought into requisition—that is, the blotter may be turned and reversed so as to bring either sheet into position for use, as well as each side of each sheet. The construction in effect constitutes a portfolio as well as a blotter.

Although the head A is preferably made square, it might be made triangular or hexagonal, for instance, and in place of four sheets there might be three or six; but in all cases the head and the leaves should be so combined as to enable the various leaves to be turned over and over in the manner described, and as indicated in the various positions shown in the drawings, so that either one of them, as stated, can be brought into use.

I claim—

An improved blotter, consisting of a suitable base or head having a series of blotting-leaves flexibly hinged thereto, with intermediate spaces adapted to receive a block of writing-paper and to be interchangeably used, all substantially as described.

AUGUST H. FREDERICK.

Witnesses:
C. D. MOODY,
C. E. HUNT.